(No Model.)
L. H. JACKSON & W. E. RHEGNESS.
HARROW.
No. 571,164. Patented Nov. 10, 1896.
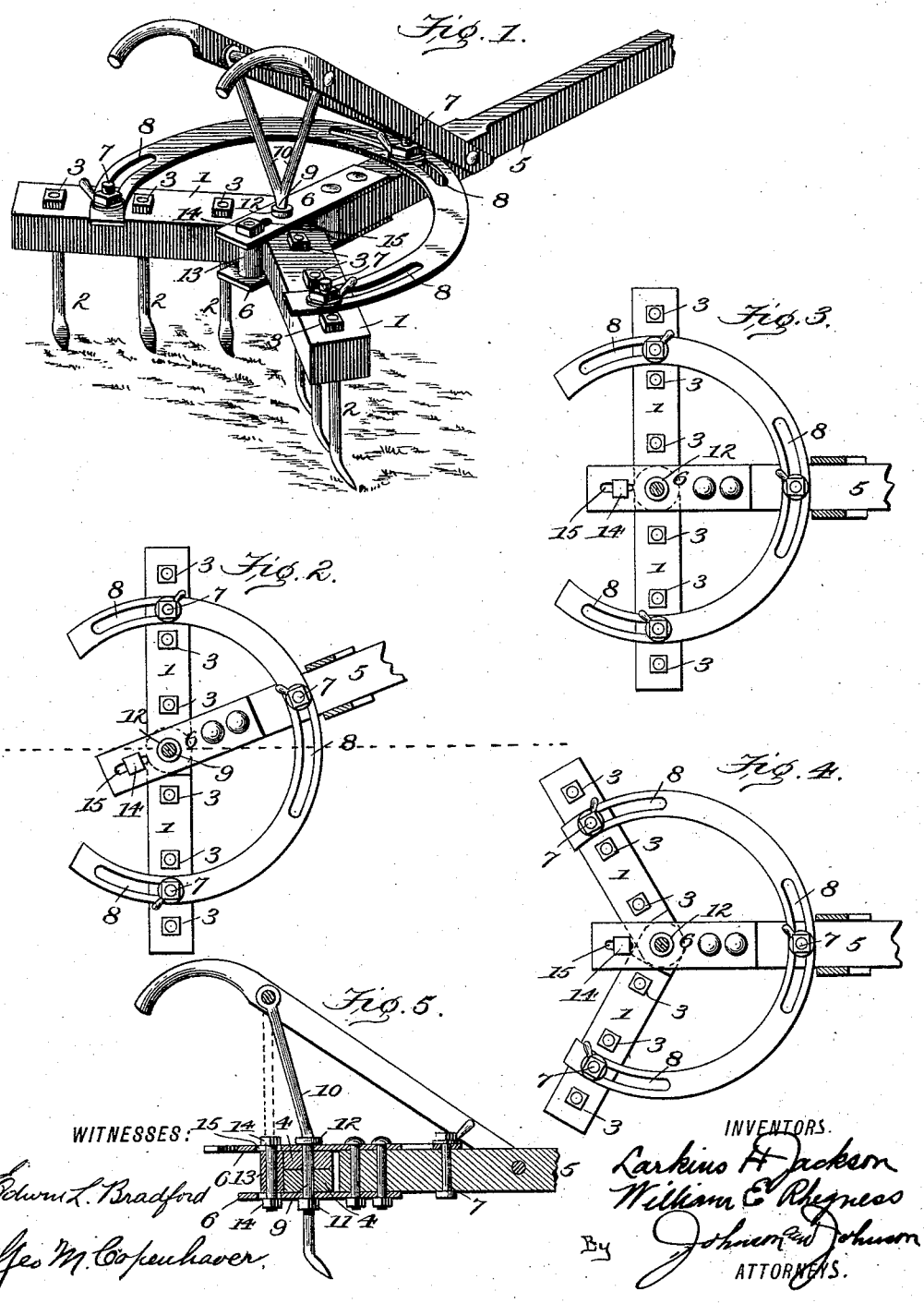
WITNESSES:
Edwin L. Bradford
Geo. M. Copenhaver
INVENTORS.
Larkins H. Jackson
William E. Rhegness
By Johnson and Johnson
ATTORNEYS.

UNITED STATES PATENT OFFICE.

LARKIN H. JACKSON AND WILLIAM E. RHEGNESS, OF DYER, TENNESSEE.

HARROW.

SPECIFICATION forming part of Letters Patent No. 571,164, dated November 10, 1896.

Application filed May 18, 1896. Serial No. 591,979. (No model.)

*To all whom it may concern:*

Be it known that we, LARKIN H. JACKSON and WILLIAM E. RHEGNESS, citizens of the United States, and residents of Dyer, in the county of Gibson and State of Tennessee, have invented a new and useful Improvement in Harrows, of which the following is a specification.

Our improved harrow is specially adapted for cultivating plants growing in rows where different kinds of work are required to suit the plants and the ground, and our improvements will be particularly pointed out in the claims concluding this specification.

In the accompanying drawings, Figure 1 shows our improved harrow in perspective. Fig. 2 shows the harrow adjusted for cultivating one side of a row of plants. Figs. 3 and 4 show different adjustments of the harrow-beams, and Fig. 5 is a vertical section of the harrow.

The harrow is of two beam parts 1 1, each having harrow teeth or plows 2 2 of any suitable form and secured in any suitable way. The teeth or plows have screw-shanks passing through the beams and secured by nuts 3 at the top and under sides of the beams, whereby the teeth or plows may be turned to adjust them as desired.

The beams have a lap-joint 4 where they are connected, and the tongue 5 has plates 6 6, which form a bifurcated rear end between and to which the lapped ends of the beams are secured.

A semicircular plate connects the outer ends of the beams with the tongue in front of the beams by clamp-bolts 7 7 7 passing through the plate, the beams, and the tongue. To allow the tongue and the beams to be adjusted to change their angles relatively with each other, the plate has slots 8 8 8 through which the bolts pass, so that the plate is independently movable on its bolts and clamped to each beam and to the tongue. This gives an independent adjustment of each beam part relatively with the other and with the tongue and an independent adjustment of the tongue relatively with the beam parts, whereby the harrow is adapted for use for different work.

As shown in the drawings, the bolt 9 which connects the beam parts and the tongue may also form a brace for the handles, and for this purpose the bolt is forked to form braces 10 above the tongue-plates and connects the cross-bar of the handles. This bolt 9 passes through the tongue-plates and the lapped ends of the harrow-beams and is secured by a nut 11 or nuts beneath the lower plate and a shoulder 12 on the brace above the top plate. The tongue-plates extend back of the harrow-beams to receive an abutment 13, secured vertically between the plates by nuts 14 or otherwise. This abutment is for the purpose of forming a firm support for the harrow-beams when the latter are set back to form a V-harrow, as shown in Fig. 1. This abutment reinforces the joint-bolt, and in connection with the lapping ends of the harrow-beams strengthens the joint connection of the plates.

The lapping of the harrow-beams at the joint reinforces the plates in resisting the tendency of the beams to twist when the teeth encounter obstructions, and this function of the lap-joint is supplemented by the supporting action of the abutment. This construction allows the beam parts to be used in line with each other as a straight harrow, and with one or both beam parts set at angles to each other; also, with the tongue at an angle to the straight beam parts, so as to harrow one side of a row. Either beam can be adjusted at an angle to the other, so as to throw the soil toward either row of plants and upon hillsides and inclined ground, as may be desired.

The handles allow the harrow to be held to the right or to the left of the line of draft and to raise either or both beam parts to pass over obstructions and to free the teeth of rubbish.

Instead of using the joint-bolt of the tooth-beams to form the braces for the handles the abutment may form such braces by extending it up, as shown in Fig. 5 by dotted lines.

To allow the harrow-beams to be adjusted to any desired width, the abutment can be set farther away or nearer to the joint by means of slots 14 in the tongue-plates, the abutment being clamped when set to the desired point to support the harrow-beams.

Different-shaped teeth and plows may be used, and they can be adjusted and set to suit different angles or positions of the beams by turning the teeth upon their screw-shanks.

It is important that the semicircular plate should be free to be moved over the bolts in the tongue and in the beams to allow the beams and the tongue to have a greater range of adjustment, as shown in the drawings. The abutment also gives the advantage of relieving the slotted plate of undue strain, which would otherwise be put upon it by the harrow-beams.

We claim—

1. The combination of the harrow-beams having a lap-joint, the tongue having plates embracing and pivoted to said lap-joint and extending in rear thereof, an abutment between the extended ends of said tongue-plates in rear of the beams, a semicircular plate having slots and screw-bolts for securing said slotted plate to the tongue and to the beam parts, for the purpose stated.

2. The combination, with the tongue, the harrow-beams having a lap-joint pivotally connected to the tongue and embraced by lapping parts thereof and a semicircular plate adjustably secured to the tongue and to the beam parts, with an abutment adjustably secured in slots of the lapping tongue parts in rear of the lap-joint of the beam, for the purpose described.

3. The combination with the tongue, the harrow-beams pivotally connected to each other and to the tongue, and the semicircular plate having slots and the screw-bolts upon which said plate is independently movable upon the beams and the tongue whereby the range of the adjustment of these parts is increased.

LARKIN H. JACKSON.
WILLIAM E. RHEGNESS.

Witnesses:
A. D. CHILDRESS,
J. E. JACKSON.